United States Patent [19]

Patzenhauer et al.

[11] Patent Number: 5,392,885
[45] Date of Patent: Feb. 28, 1995

[54] ADJUSTABLE HYDRAULIC VIBRATION DAMPER FOR MOTOR VEHICLES

[75] Inventors: Andree Patzenhauer, Eitorf-Lindscheid; Winfried Geilhausen, Windeck-Leuscheid, both of Germany

[73] Assignee: Fichtel & Sachs AG, Eitorf, Germany

[21] Appl. No.: 63,024

[22] Filed: May 17, 1993

Related U.S. Application Data

[63] Continuation of Ser. No. 824,042, Jan. 23, 1992, abandoned.

[51] Int. Cl.⁶ .............................................. F16F 9/46
[52] U.S. Cl. ........................... 188/299; 188/322.13; 188/322.19
[58] Field of Search ............... 188/282, 298, 299, 318, 188/319, 322.13, 322.14, 322.21; 280/707; 267/64.16, 119

[56] References Cited

U.S. PATENT DOCUMENTS

| | | | |
|---|---|---|---|
| 3,040,841 | 6/1962 | Schultze | 188/299 |
| 3,123,093 | 3/1964 | Akerman et al. | 137/58 X |
| 4,501,291 | 2/1985 | Siegrist | 137/529 |
| 4,683,492 | 8/1987 | Watanabe | 188/299 |
| 4,785,920 | 11/1988 | Knecht et al. | 188/299 |
| 4,834,088 | 5/1989 | Jeansan | 188/299 |
| 4,838,394 | 6/1989 | Lemme et al. | 188/299 |
| 4,880,086 | 11/1989 | Knecht et al. | 188/322.13 X |
| 4,973,854 | 11/1990 | Hummel | 188/299 |
| 5,090,525 | 2/1992 | Öhlin | 280/707 |
| 5,113,980 | 5/1992 | Fuerrer et al. | 188/299 |
| 5,251,730 | 10/1993 | Ackermann et al. | 188/318 |

FOREIGN PATENT DOCUMENTS

| | | | |
|---|---|---|---|
| 3138933 | 4/1983 | Germany . | |
| 3303293 | 1/1984 | Germany . | |
| 3412544 | 10/1985 | Germany . | |
| 3413815 | 10/1985 | Germany | 188/319 |
| 3518327 | 11/1986 | Germany . | |
| 56-14663 | 2/1981 | Japan . | |
| 14663 | 2/1981 | Japan | 137/529 |

Primary Examiner—Robert J. Oberleitner
Assistant Examiner—Chris Schwartz
Attorney, Agent, or Firm—Nils H. Ljungman & Associates

[57] ABSTRACT

An adjustable hydraulic vibration damper for motor vehicles includes a hydraulically and/or pneumatically adjustable control body of a damping valve which guarantees a continuous damping force adjustment, whereby when a control pressure falls below a minimum value, a high damping force is automatically generated. For this purpose, there is a control body for controlling passage of damping fluid through a flow channel, which control body has, on the side opposite the channel, a piston which works together with the control body, whereby a control pressure simultaneously presses against the neighboring end surfaces of the control body and of the control piston to provide a desired amount of damping force for control of the flow of damping fluid through the flow passage.

20 Claims, 4 Drawing Sheets

ADJUSTABLE HYDRAULIC VIBRATION DAMPER FOR MOTOR VEHICLES

This application is a continuation of U.S. patent application Ser. No. 07/824,042, which was filed on Jan. 23, 1992, now abandoned.

BACKGROUND OF THE INVENTION

1. Field of the Invention

This invention relates to an adjustable hydraulic vibration damper for motor vehicles. The vibration damper has a damping piston fastened to a piston rod, with the damping piston dividing the work cylinder into two chamber portions which are filled with damping fluid. The damping fluid is able to flow between the two chamber portions along a connecting passageway. There is also at least one damping valve which reacts as a function of pressure to control the channel. This damping valve is controlled by a control body, and the control body is pressurized by a control pressure.

2. Background of the Invention

Damping force regulating devices for telescoping vibration dampers are known. For example, German Published Patent Application No. 33 03 293 discloses a damping force regulating device in which there is an additional, double-acting damping valve that is integrated into the damping piston itself. These double-acting damping valves are connected in series and can be separated from one another by a rotary disk valve. Such a configuration provides, in a first switching position, that only the valves of the guide piston carry a flow to thereby achieve a soft damping characteristic. In addition, in a second switching position, the valves in the guide piston and the supplemental valves carry an equal flow, so that a correspondingly hard damping characteristic can be set. To make any adjustments, a rotary disk valve is used, and this rotary disk valve is activated by an electrically operated actuator motor or servo-motor.

Other types of damping force regulating devices include adjustable vibration dampers. For example, German Patent No. 35 18 327 discloses a coil spring within the upper part of the piston rod of the adjustable vibration damper. Within this coil, an armature is axially movable as a function of the current fed to the coil. This armature creates a bypass opening between the upper and lower work chambers. Vibration dampers having such a magnetic coil, such as the damper disclosed in German Patent No. 35 18 327, are complex and expensive to manufacture.

OBJECT OF THE INVENTION

The object of the invention is therefore to create a less complex, inexpensive, adjustable hydraulic vibration damper in which a hydraulically and/or pneumatically adjustable control body of the damping valve, makes possible a continuous damping adjustment, whereby when the control pressure falls below a specified minimum, a high damping force is automatically produced.

SUMMARY OF THE INVENTION

This object can be achieved in accordance with the present invention in which a control body for controlling a fluid flow through a channel between chamber portions, preferably has a piston on the side of the control body opposite the side which closes off the channel. This piston preferably works together with the control body so that as a control pressure pressurizes the neighboring end surfaces of the control body and of the piston, the flow of damping fluid through the channel is controlled.

One advantage of having a piston preferably work together with the control body, as disclosed by the present invention, is that the expense of a magnetic coil in the vibration damper can essentially be eliminated. In addition, another advantage can be found in that the use of a control body which is preferably moved by a pneumatic and/or a hydraulic control pressure may be very easily realized in vehicles which are already equipped with a pneumatic suspension.

For trucks, which are increasingly being equipped with pneumatic suspension systems, the use of a pneumatically activated adjustment apparatus can be particularly appropriate. The additional expense and complexity for any additional controls for pneumatic activation of the adjustment apparatus is therefore relatively low. Such an adjustment apparatus could also easily be used in passenger cars which have pneumatic or hydropneumatic suspension systems. An additional advantage of the present invention is that the control pressure preferably pressurizes the piston and the control body simultaneously, so that when the control pressure drops below a specified minimum pneumatic and/or hydraulic control pressure, a safety-relevant maximum damping force is generated.

In accordance with an additional feature of the present invention, the back side of the control piston can be pressurized with a pressure that is independent of the control pressure. This independent pressure is preferably the force applied by the pressure of the atmosphere and/or the pressure of a spring.

In one configuration of the present invention, the end surface of the control body and the end surface of the piston, both pressurized by the control pressure, can preferably be of different sizes.

In an additional configuration of the present invention, there can preferably be a spacer element to form a cavity between the neighboring end surfaces of the control body and of the piston.

In addition, a particularly simple configuration of the cavity is possible if a preferably ring-shaped component with recesses therein, is used as the spacer element, or if the spacer element preferably is formed as a single unit together with the control body or the piston.

The damping valve of such a system can essentially be located in a variety of positions with respect to the vibration damper. One particularly favorable location of the valve is in the vicinity of the vibration damper, e.g. on the outer wall of the damper. Other favorable locations include, but are not limited to: inside the vibration damper in the vicinity of the damping piston; and as a separate component located between a pressure reservoir and a spring cylinder.

When the damping valve is located in the damping piston of the vibration damper, in accordance with an essential feature of the present invention, the control pressure can preferably be transmitted to the cavity through a flow connection within the piston rod. In a similar manner, the pressure of the atmosphere can advantageously also be transmitted via the piston rod to the back side of the piston.

One aspect of the invention resides broadly in an adjustable vibration damper for motor vehicles. The adjustable vibration damper comprising: a cylinder, the cylinder defining a chamber therein; a first piston disposed within the chamber of the cylinder, the first piston for damping vibrations transmitted to the cylinder, the first piston dividing the chamber into a first chamber portion and a second chamber portion; at least a first connecting passage for allowing damping fluid to flow between the first and the second chamber portions; and at least one valve for controlling the flow of damping fluid through the first connecting passage. The at least one valve comprising: a valve body disposed adjacent the first connecting passage, the valve body having a first end for blocking at least a portion of the first connecting passage to control the flow of damping fluid through the first connecting passage; second piston disposed adjacent the valve body, the valve body having a first surface disposed adjacent the second piston, the second piston having a first surface disposed adjacent the valve body; and apparatus for applying a first pressure to the first surface of the valve body and the first surface of the second piston to control the flow of damping fluid through the first connecting passage.

Another aspect of the invention resides broadly in an adjustable vibration damper for motor vehicles. The adjustable vibration damper comprising: a cylinder, the cylinder defining a chamber therein; a first piston disposed within the chamber of the cylinder, the first piston for damping vibrations transmitted to the cylinder, the first piston dividing the chamber into a first chamber portion and a second chamber portion; at least a first connecting passage for allowing damping fluid to flow between the first and the second chamber portions; and at least one valve for controlling the flow of damping fluid through the first connecting passage. The at least one valve comprising: a valve body disposed adjacent the first connecting passage, the valve body having a first end for blocking at least a portion of the first connecting passage to control the flow of damping fluid through the first connecting passage; second piston disposed adjacent the valve body, the valve body having a first surface disposed adjacent the second piston, the second piston having a first surface disposed adjacent the valve body; and apparatus for applying a first pressure to the first surface of the valve body and the first surface of the second piston to control the flow of damping fluid through the first connecting passage.

BRIEF DESCRIPTION OF THE DRAWINGS

Preferred embodiments of the invention are schematically illustrated in the accompanying drawings, in which.

DESCRIPTION OF THE PREFERRED EMBODIMENTS

Figure 1:
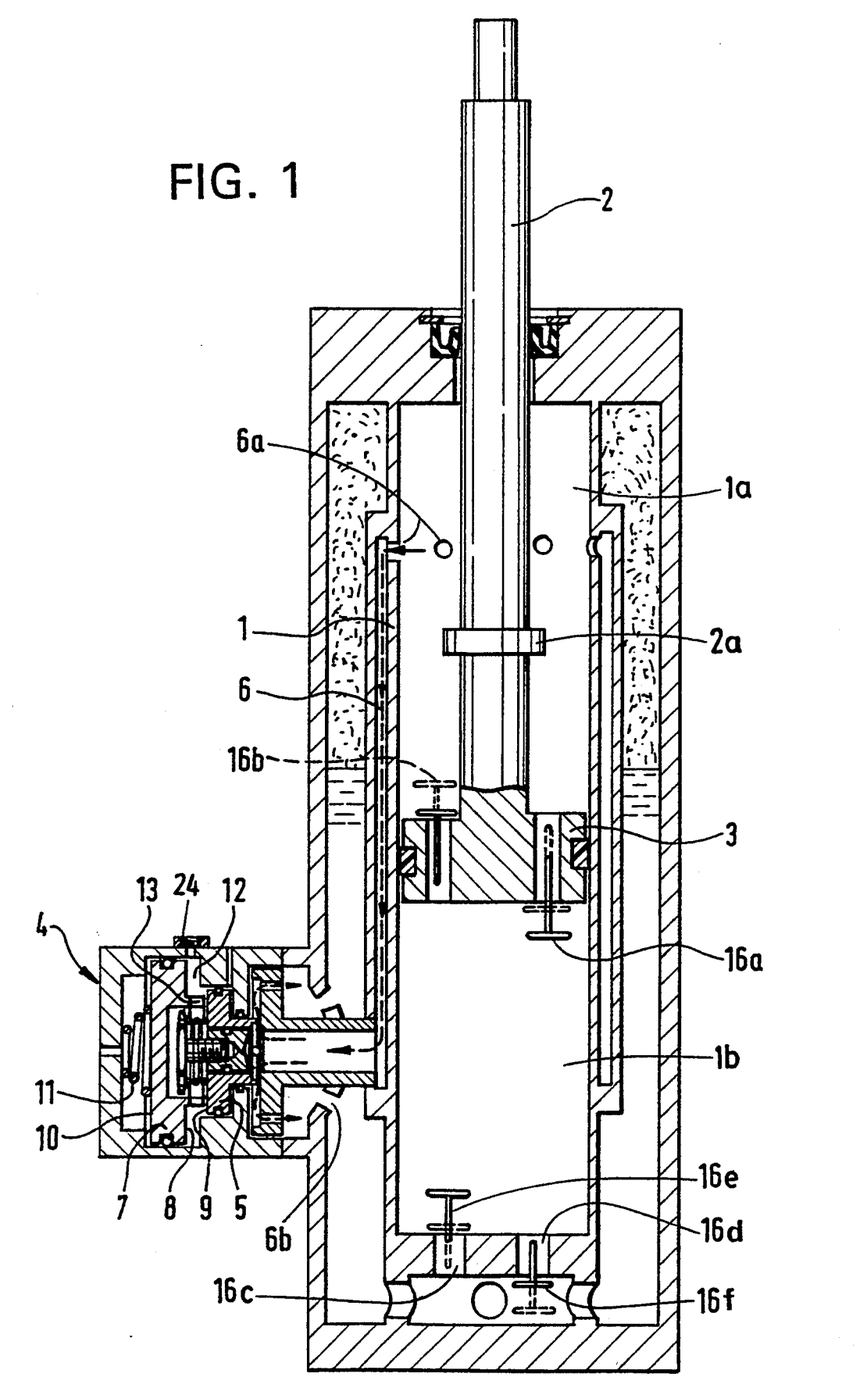
FIG. 1 shows, in cross section, a vibration damper with a damping valve, which vibration damper essentially reacts as a function of the pressure.

The vibration damper illustrated in FIG. 1 has a piston rod 2 connected to a damping piston 3, which damping piston 3 preferably divides the space within the work cylinder 1 into an upper chamber portion 1a and a lower chamber portion 1b. Piston rod 2 can preferably have a stop 2a disposed thereon for limiting movement of the piston rod 2 out of the cylinder 1. The damping piston 3 is preferably equipped with valves 16a and 16b to generate a damping force. In addition, the upper chamber portion may be connected to the lower chamber portion by means of a channel 6, so that fluid can flow, by means of openings 6a and 6b, between the upper and lower chamber portions. The lower chamber portion 1b can preferably be in fluid communication with the opening 6b by means of additional flow passages 16c and 16d disposed at a lower end of the work cylinder 1. Passages 16c and 16d can be equipped with mono-directional flow valves 16e and 16f to control flow of fluid therethrough. In the channel 6, a passage is preferably pressurized by means of a control body 5, while the control body 5 of the pressure-dependent damping valve 4 is preferably pressurized by a means of a control pressure. This control pressure can be introduced into the damping valve 4 by way of the passage 24.

The damping valve 4 of the impact damper can preferably be used for the continuous adjustment of the damping force, whereby it can essentially be guaranteed that a high damping force can be automatically generated, via the piston 7 and the spring 11, when the control pressure drops below a specified minimum value.

Figure 2:
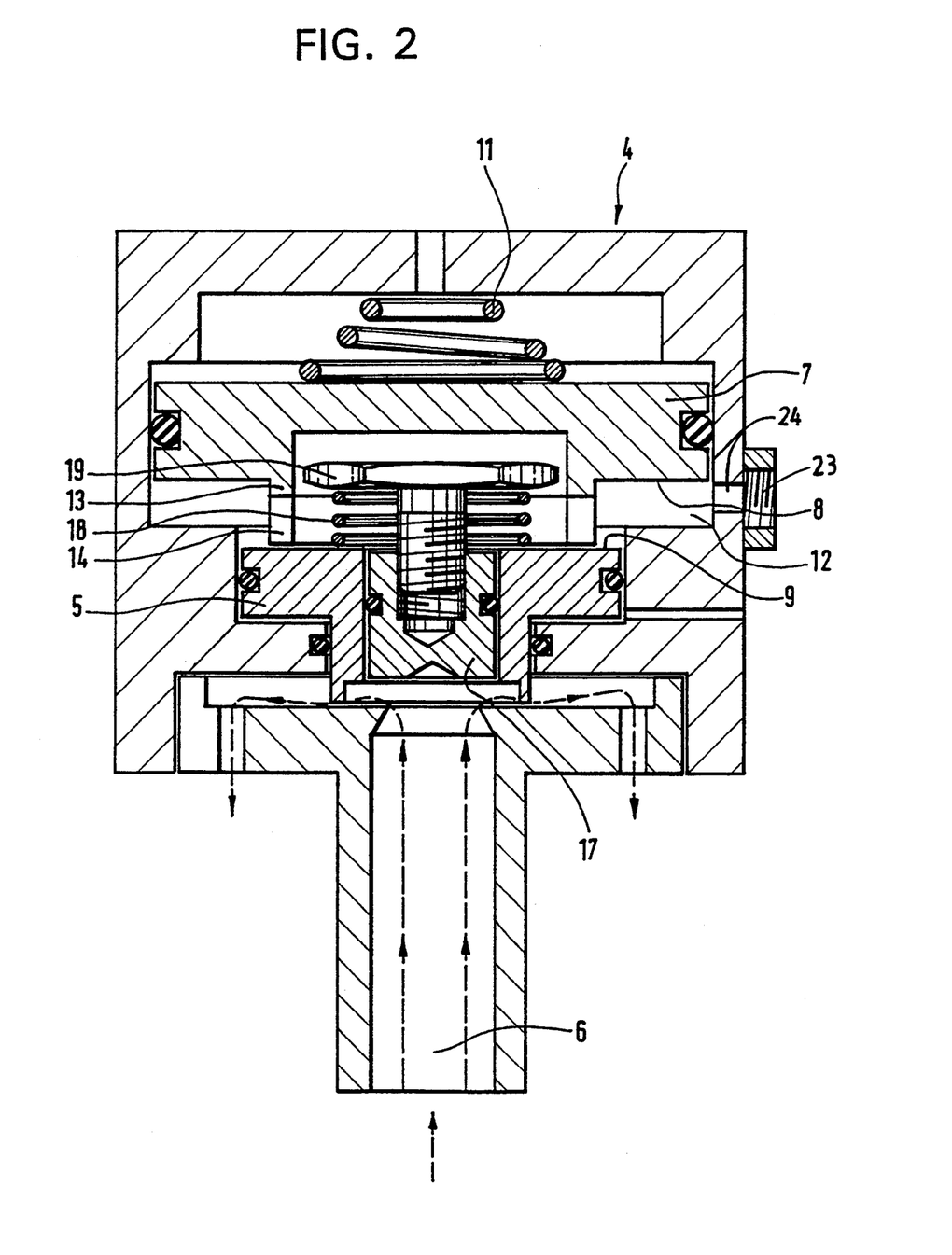
FIG. 2 shows, in an enlarged scale, a cross-sectional detail of a damping valve, which damping valve reacts as a function of pressure.

For the purpose of continuous adjustment of the damping force, in the damping valve 4, a cavity 12 can preferably be formed between the end surface 8 of the piston 7 and the end surface 9 of the control body 5. The control pressure can then preferably be transmitted into the cavity 12 through passage 24, to thereby simultaneously pressurize the control body 5 and the piston 7 against the spring 11 and/or the atmospheric pressure. To achieve a corresponding damping force characteristic, the end surfaces 8 and 9 of the control body 5 and of the piston 7, respectively, can preferably be of different sizes. As shown in FIG. 2, a diameter of the control body 5 can be about ¾ of a diameter of the piston 7. The surface 8 can then be about twice as large in area as the surface 9. Thus, when the control pressure is admitted into the cavity 12, the piston 7 is thereby preferably pushed outward against the spring 11 and/or the atmospheric pressure, while the control body 5 is moved toward the channel, so that a defined cross section may be achieved in relation to the system pressure in the channel 6. If the control pressure in the cavity 12 fails, the piston 7 can push, by means of its integrated spacer element 13, on the control body 5 and thereby close off the channel 6.

Such a configuration for control of the damping of a vibration damper could be configured to provide either a low damping force or a high damping force in a control pressure on, control pressure off type of operation, or alternatively, the control pressure could be continuously variable over a range of pressures to provide continuously variable damping over the range from the low damping force to the high damping force.

FIG. 2 shows an enlarged detail of a pressure-dependent damping valve 4. The damping valve 4 can have, preferably in alignment with the cavity 12, a control passage 24 for entry of the control medium into the cavity 12. The control pressure supply (not shown) can preferably be connected to the valve 4 by means of a connector 23 which may be a threaded sleeve. The control pressure can be admitted into the cavity 12, via passage 23, to preferably, simultaneously pressurize the end surface 8 of the piston 7 and the end surface 9 of the control body 5.

By means of the recesses 14 in the spacer element 13, the control pressure can generally be applied over the entire end surfaces 8 and 9. The preferably different diameters of the piston 7 and of the control body 5 can essentially guarantee a defined amount of damping force. The application of control pressure into cavity 12 thereby presses piston 7 outward against the force of the spring 11 and/or the atmospheric pressure. This essentially can enable the control body 5 to move away from the passage 6 when the pressure of the fluid flowing through passage 6 pushes against the control pressure in the cavity 12. Thus, the damping medium flowing through the channel 6 can therefore bypass the control body 5 and flow between the two chamber portions 1a and 1b (shown in FIG. 1a).

If the control pressure fails, the force of the spring 11 and atmospheric pressure will essentially no longer be counteracted, and the force of the spring 11 and the atmospheric pressure will force the piston 7, by means of the spacer element 13, to essentially push the control body 5 closed. This would then essentially shut off the channel 6, and the channel 6 would essentially remain closed until the control pressure could be reestablished. In this manner, a high damping force would result any time that the control pressure fails.

To establish a base pressure for the opening of the passage 6, the control body 5 can preferably be equipped with an actuator piston 17. This actuator piston 17 can preferably be adjusted by means of the spring 18 and the actuator element 19 to set a predetermined amount of pressure for the control of the opening of the passage 6.

Figure 3:
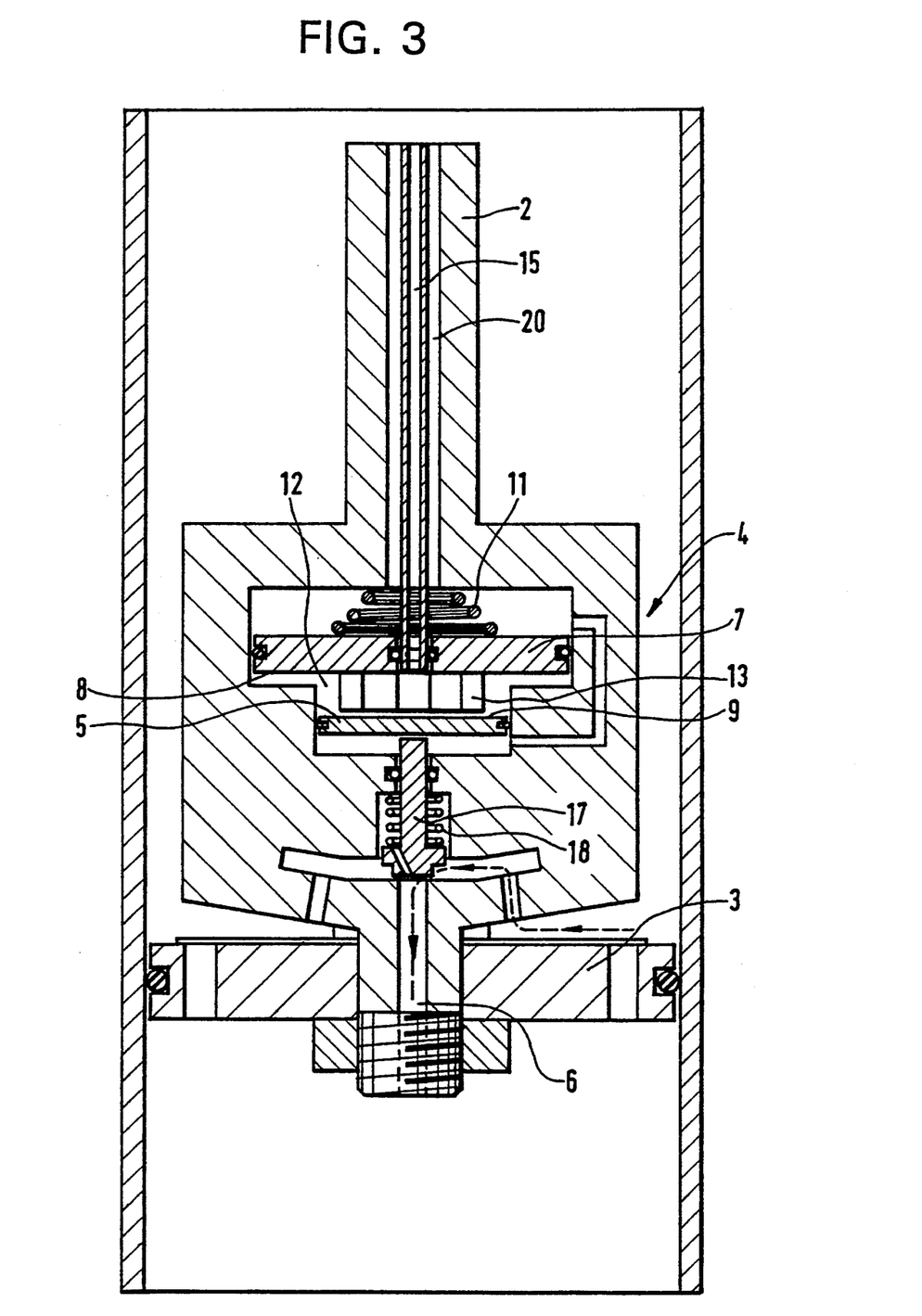
FIG. 3 shows another embodiment of a damping valve in which the adjustable damping valve is preferably located in the damping piston of the vibration damper.

FIG. 3 shows an alternative embodiment in which the adjustable damping valve 4 can be located within the damping piston 3 of the vibration damper.

In this configuration, the piston 7 can also preferably be pressurized by the spring 11 and/or atmospheric pressure, but the atmospheric pressure essentially has to be conducted to the piston 7 by means of a connection passage 20 which can preferably be disposed within the piston rod 2. The control pressure can also preferably be transmitted through a flow connection 15 within the piston rod 2, to the end surface 8 of the piston 7, and the end surface 9 of the control body 5. In this configuration, the actuator piston 17 can simultaneously serve as a component of the control piston 5 and a component of the device for setting the base pressure, as discussed above. As such, the spring 18 is used to set the base damping, while the control piston 5 can press against an end of the actuator piston 17 to force the actuator piston 17 downward to seal off the passage 6. When the control pressure disappears, the atmospheric pressure and the spring 11 essentially move the piston 7 via the spacer element 13 toward the control body 5, thereby closing the channel 6.

Figure 4:
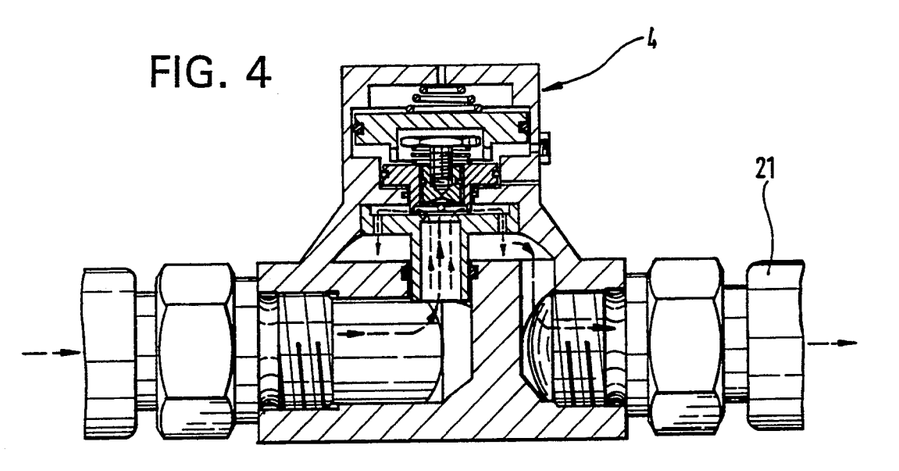
FIG. 4 shows a damping valve, which reacts as a function of pressure, and which may be utilized as a separate component in a hydraulic flow connection.

As shown in FIG. 4, the damping valve 4, which is essentially the same damping valve as illustrated in FIG. 1, may also easily be located as a separate component within a flow connection 21. In such a flow connection, the manner of operation of the damping valve 4 preferably corresponds to the manner of operation of the damping valve 4 illustrated in FIG. 1.

Figure 5:
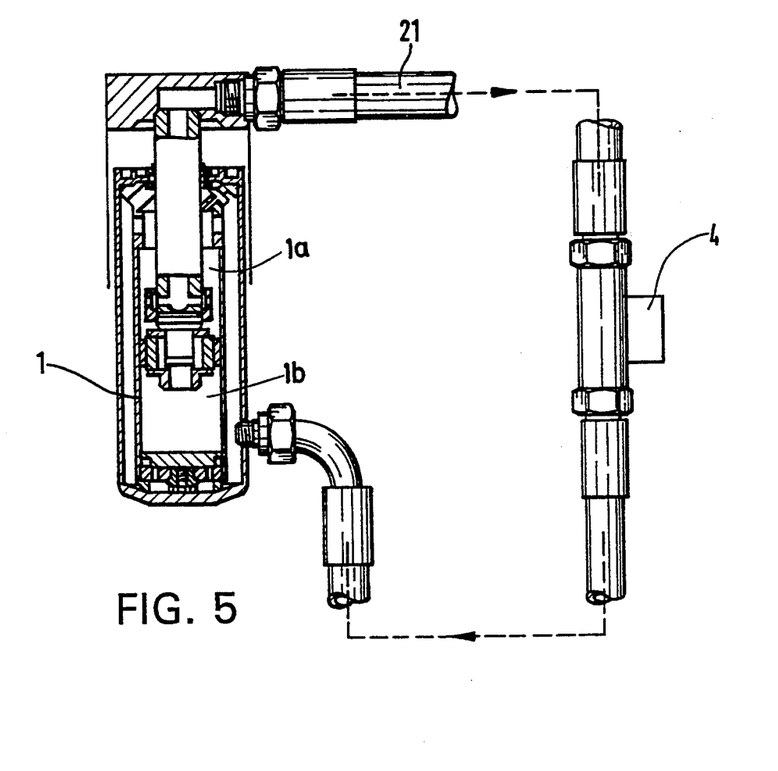
FIG. 5 shows the installation of the damping valve of FIG. 4 in an alternative flow connection.

FIG. 5 shows one possible embodiment for the installation and connection of the damping valve 4, incorporated into a flow connection 21, for use with a work cylinder for vibration damping. As shown, the flow connection 21 can be disposed in the passage which preferably connects the upper chamber portion 1a to the lower chamber portion 1b of the work cylinder 1.

In summary, one feature of the invention resides broadly in a hydraulic, adjustable vibration damper for motor vehicles, with a damping piston fastened to a piston rod, which damping piston preferably divides the work cylinder into two chamber halves filled with damping fluid, whereby there is at least one damping valve which damping valve reacts as a function of the pressure to control a channel, which channel is preferably controlled by a control body pressurized by control pressure. Corresponding to the control body 5, on the side opposite the channel 6, there is a piston 7, which piston preferably works together with the control body 5, whereby the control pressure simultaneously pressurizes the neighboring end surfaces 8, 9 of the control body 5 and of the piston 7.

Another feature of the invention resides broadly in a vibration damper having a piston 7, which piston has a reverse side 10 that is pressurized at a pressure independent of the control pressure.

Yet another feature of the invention resides broadly in a vibration damper having an independent pressure that is preferably the pressure of the atmosphere and/or of a spring 11.

A further feature of the invention resides broadly in a vibration damper comprising end surfaces 8, 9 of a control body 5 and of a piston 7, which end surfaces are pressurized by the control pressure and which surfaces are of different sizes.

A yet further feature of the invention resides broadly in a vibration damper, having a spacer element 13 to form a cavity 12 between the neighboring end surfaces 8 and 9 of the control body 5 and of the piston 7.

Yet another further feature of the invention resides broadly in a vibration damper, having a spacer element 13, which spacer element may be a ring-shaped component having recesses 14.

An additional feature of the invention resides broadly in a vibration damper having a spacer element 13 together with a control body 5 or a piston 7 and preferably designed as a one-piece component.

Another additional feature of the invention resides broadly in a vibration damper preferably having a damping valve 4 located in the vicinity of the vibration damper.

A yet additional feature of the invention resides broadly in a vibration damper having a damping valve 4, preferably designed as a separate component and which damping valve 4 is preferably located in the damping piston 3.

A further additional feature of the invention resides broadly in a vibration damper having the control pressure of the vibration damper preferably transmitted by means of a flow connection 15 in the piston rod 2 to the cavity 12.

A yet further additional feature of the invention resides broadly in a vibration damper having the pressure of the atmosphere transmitted via the piston rod of the vibration damper to the reverse side 10 of the piston 7.

All, or substantially all, of the components and methods of the various embodiments may be used with at least one embodiment or all of the embodiments, if any, described herein.

The invention as described hereinabove in the context of the preferred embodiments is not to be taken as limited to all of the provided details thereof, since modifications and variations thereof maybe made without departing from the spirit and scope of the invention.

What is claimed is:

1. An adjustable vibration damper for motor vehicles, said adjustable vibration damper comprising:

a first cylinder, said first cylinder defining a chamber therein;

first piston means disposed within said chamber of said first cylinder, said first piston means for damping vibrations transmitted to said first cylinder, said first piston means dividing said chamber into a first chamber portion and a second chamber portion;

said first piston means comprising:

first fluid passage means disposed therethrough and fluidly connecting said first chamber portion to said second chamber portion; and bi-directional valve means disposed within said first fluid passage means for generating a first damping force and allowing fluid flow from each of said first chamber portion and said second chamber portion to the other of said first chamber portion and said second chamber portion through said first fluid passage means;

at least a second fluid passage by-passing said piston means for allowing damping fluid to flow between said first and said second chamber portions around said piston means;

at least one additional valve means for controlling said flow of damping fluid through said second fluid passage, said at least one additional valve means for generating a secondary damping force, and said at least one additional valve means comprising:

valve body means disposed adjacent said second fluid passage, said valve body means having a first end for blocking at least a portion of said second fluid passage to control said flow of damping fluid through said second fluid passage, and a second end opposite said first end;

said damping fluid for applying a first pressure to said first end of said valve body means to open said second fluid passage;

second piston means disposed adjacent said second end of said valve body means;

said second end of said valve body means having a first surface disposed towards said second piston means;

said second piston means having a first surface disposed towards said valve body means;

means for introducing a pressure medium between said first surface of said valve body means and said first surface of said second piston means to apply a second pressure to said first surface of said valve body means and said first surface of said second piston means; and said second pressure being independent from said first pressure to oppose said first pressure and close said second fluid passage to control said flow of damping fluid through said second fluid passage.

2. The vibration damper according to claim 1, wherein:

said at least one additional valve means further comprises means for maintaining said pressure medium separate from said damping fluid;

said first surface of said second piston means is disposed towards said first surface of said valve body means; and said means for introducing said pressure medium to apply said second pressure to said first surface of said valve body means and said first surface of said second piston means is for applying pressure to said first surface of said valve body means and said first surface of said second piston means to move said first surface of said second piston means in a direction away from said first surface of said valve body means.

3. The vibration damper according to claim 2, wherein:

said first surface of said second piston means comprises a contacting portion for contacting said first surface of said valve body means;

said second piston means has a second surface disposed opposite said first surface;

said at least one additional valve means additionally comprises means for applying a third pressure to said second surface of said second piston means, said third pressure being in a direction substantially opposite a direction of said second pressure applied to said first surface of said second piston means; and said third pressure is for being applied to said second surface of said second piston means to press said contacting portion of said first surface of said second piston means into contact with said first surface of said valve body means to press said first end of said valve body means into said second fluid passage to at least partially block said flow of damping fluid through said second fluid passage.

4. The vibration damper according to claim 3, wherein:

said at least one additional valve means comprises a housing for housing said valve body means and said second piston means;

said third pressure comprises at least one of:

pressure of the atmosphere; and pressure of biasing means disposed between said second surface of said second piston and the housing of said at least one additional valve means.

5. The vibration damper according to claim 4, wherein:

said at least one additional valve means comprises seal means for inhibiting passage of at least one of:

said pressure medium, and said damping fluid, around said valve body means; and said means for maintaining said pressure medium separate from said damping fluid comprises said valve body means and said seal means.

6. The vibration damper according to claim 5, wherein:

said first surface of said second piston means comprises a spacer element extending therefrom and towards said first surface of said valve body means;

said spacer element comprises said contacting portion of said first surface of said second piston means; and said first surface of said valve body means and said first surface of said second piston means are of different sizes, with said first surface of said second piston means being substantially larger than said first surface of said valve body means.

7. The vibration damper according to claim 6, wherein:
   said spacer element comprises a ring-shaped member having openings therethrough to allow fluid communication between an inner portion of said spacer element and an outer portion of said spacer element;
   said ring shaped member having a first end disposed towards said first surface of said valve body means; and
   said first end of said ring-shaped member comprises said contacting portion of said first surface of said second piston means.

8. The vibration damper according to claim 7, wherein said valve body means comprises means for establishing an actuating pressure for opening said second flow passage, said means for establishing said actuating pressure comprising:
   a third piston disposed in said valve body means;
   biasing means for applying tension between said third piston and said valve body means; and
   an actuator element for altering tension between said third piston and said valve body means.

9. The vibration damper according to claim 8, wherein:
   said first surface of said second piston means is about twice as large as said first surface of said valve body means whereby said pressure medium acts on said first surface of said second piston means with about twice the force that said pressure medium acts on said first surface of said valve body means;
   said vibration damper additionally comprises a piston rod having a first end disposed at least partially within said first cylinder through a first end of said first cylinder;
   said first piston means is disposed at said first end of said piston rod;
   said bi-directional valve means comprises two oppositely functioning mono-directional valves;
   said first fluid passage means comprises two first fluid passages disposed through said first piston means for allowing damping fluid to flow between said first and said second chamber portions;
   each of said two first fluid passages comprises one of said two mono-directional valves of said bi-directional valve means for generating an additional damping force;
   one of said two first fluid passages being configured to allow fluid flow from said first chamber portion into said second chamber portion, and the other of said two first fluid passages being configured to allow fluid flow from said second chamber portion into said first chamber portion;
   said first cylinder comprises two additional connecting passages for connecting said second chamber portion to said second fluid passage, each of said two additional connecting passages of said first cylinder comprising mono-directional valve means disposed therein for damping flow of damping fluid between said second chamber portion and said second fluid passage; and
   one of said two additional connecting passages being configured to allow fluid flow from said second chamber portion into said second fluid passage, and the other of said two additional connecting passages being configured to allow fluid flow from said second fluid passage into said second chamber portion.

10. The vibration damper according to claim 9, wherein said vibration damper is configured to have:
    a high damping force provided by said additional damping force of said two first fluid passages when said second fluid passage is blocked by said first end of said valve body means; and
    a low damping force provided by a combination of said damping force of said second fluid passage and said additional damping force of said two first fluid passages when said second fluid passage is open for flow of damping fluid therethrough.

11. The vibration damper according to claim 10, wherein:
    said at least one additional valve means is at least one of:
       located in a housing disposed adjacent said vibration damper; and
       located in a flow connection disposed spaced apart from said vibration damper, said flow connection having means for connecting said flow connection to said first and said second chamber portions of said vibration damper; and said vibration damper further comprises:
    a second cylinder disposed about said first cylinder and defining a second chamber between said first cylinder and said second cylinder;
    a third cylinder disposed about a portion of said first cylinder between said first cylinder and said second cylinder;
    said third cylinder defining a cylindrical third chamber between said first cylinder and said third cylinder, said cylindrical third chamber comprising at least a portion of said second fluid passage;
    said third cylindrical chamber having a first end in fluid communication with said first chamber portion, and a second end in fluid communication with said at least one additional valve means;
    said first cylinder comprising a plurality of orifices disposed in a circular arrangement thereabout to provide said fluid communication between said third cylindrical chamber and said first chamber portion;
    said piston rod comprises stop means for limiting movement of said piston rod within said first cylinder, said stop means being spaced a first distance from said first piston means;
    said circular arrangement of orifices being spaced a second distance from the first end of said first cylinder, said second distance being greater than said first distance to prevent said piston means from blocking said orifices;
    said first cylinder has a second end opposite to said first end, said second end comprises said at least two additional connecting passages and said mono-directional valve means disposed therein;
    said damping fluid is disposed within said first chamber portion and said second chamber portion of said first chamber, and said second chamber is partially filled with said damping fluid; and
    said second chamber comprises at least an additional portion of said second fluid passage between said at least one additional valve means and said second end of said first cylinder.

12. The vibration damper according to claim 10, wherein:

said first piston means comprises said at least one additional valve means;

said means for introducing said pressure medium and applying said second pressure to said first surface of said valve body means and said first surface of said second piston means comprises a third passage disposed within said piston rod; and said means for applying said third pressure to said second surface of said second piston means comprises a fourth passage disposed within said piston rod.

13. A combination control valve and adjustable vibration damper, the adjustable vibration damper comprising: a cylinder, said cylinder defining a chamber therein; first piston means disposed within said chamber of said cylinder, said first piston means for damping vibrations transmitted to said cylinder, said first piston means dividing said chamber into a first chamber portion and a second chamber portion; and at least a first connecting passage for allowing damping fluid to flow between said first and said second chamber portions; said control valve for controlling said flow of damping fluid through said first connecting passage, said control valve comprising:

valve body means disposed adjacent said first connecting passage, said valve body means having a first end for blocking at least a portion of said first connecting passage to control said flow of damping fluid through said first connecting passage, and a second end opposite said first end;

said damping fluid for applying a first pressure to said first end of said valve body means to open said first connecting passage;

second piston means disposed adjacent said second end of said valve body means;

said second end of said valve body means having a first surface disposed towards said second piston means;

said second piston means having a first surface disposed towards said valve body means;

means for introducing a pressure medium between said first surface of said valve body means and said first surface of said second piston means to apply a second pressure to said first surface of said valve body means and said first surface of said second piston means;

means for maintaining said pressure medium separate from said damping fluid; and said second pressure being independent from said first pressure to oppose said first pressure and close said connecting passage to control said flow of damping fluid through said first connecting passage.

14. The control valve and vibration damper combination according to claim 13, wherein:

said means for maintaining said pressure medium separate from said damping fluid comprises said valve body means;

said first surface of said second piston means is disposed towards said first surface of said valve body means; and said means for introducing said pressure medium to apply said second pressure to said first surface of said valve body means and said first surface of said second piston means is for applying pressure to said first surface of said valve body means and said first surface of said second piston means to move said first surface of said second piston means in a direction away from said first surface of said valve body means to allow said valve body means to be displaced out of said first connecting passage.

15. The control valve and vibration damper combination according to claim 14, wherein:

said first surface of said second piston means comprises a contacting portion for contacting said first surface of said valve body means;

said second piston means has a second surface disposed opposite said first surface;

said control valve additionally comprises means for applying a third pressure to said second surface of said second piston means, said third pressure being in a direction substantially opposite a direction of said second pressure applied to said first surface of said second piston means; and said third pressure is for being applied to said second surface of said second piston means to press said contacting portion of said first surface of said second piston means into, contact with said first surface of said valve body means to press said first end of said valve body means into said first connecting passage to at least partially block said flow of damping fluid through said first connecting passage.

16. The control valve and vibration damper combination according to claim 15, wherein:

said control valve comprises a housing for housing said valve body means and said second piston means;

said third pressure comprises at least one of:
pressure of the atmosphere; and
pressure of biasing means disposed between said second surface of said second piston and the housing of said control valve.

17. The control valve and vibration damper combination according to claim 16, wherein said first surface of said valve body means and said first surface of said second piston means are of different sizes, with said first surface of said second piston means being substantially larger than said first surface of said valve body means, whereby said pressure medium applies a substantially greater force on said first surface of said second piston means than said pressure medium applies on said first surface of said valve body means.

18. The control valve and vibration damper combination according to claim 17, wherein:

said first surface of said second piston means comprises a spacer element extending therefrom and towards said first surface of said valve body means; and said spacer element comprises said contacting portion of said first surface of said second piston means.

19. The control valve and vibration damper combination according to claim 18, wherein:

said first surface of said second piston means is greater than about twice as large as said first surface of said valve body means, whereby the force applied by said pressure medium on said first surface of said second piston means is greater than about twice the force applied by said pressure medium on said first surface of said valve body means;

said spacer element comprises a ring shaped member having openings therethrough to allow fluid communication between an inner portion of said spacer element and an outer portion of said spacer element;

said ring shaped member has a first end disposed towards said valve body means; and said first end of said ring shaped member comprises said contacting portion of said first surface of said second piston means.

20. The control valve and vibration damper combination according to claim 19, wherein said valve body means comprises means for establishing a base actuating pressure for opening said first connecting passage to allow said flow of damping fluid through said first connecting passage, said means for establishing said base actuating pressure comprising:

a third piston disposed in said valve body means;

biasing means for applying tension between said third piston and said valve body means; and an actuator element for altering tension between said actuating piston and said valve body means.

* * * * *